Sept. 16, 1952 N. A. HALLWOOD 2,610,844
SCALE
Filed Dec. 16, 1946 3 Sheets-Sheet 1

INVENTOR.
Nathan A. Hallwood
BY
Herschel C. Omohundro
attorney

Sept. 16, 1952 N. A. HALLWOOD 2,610,844
SCALE
Filed Dec. 16, 1946 3 Sheets-Sheet 2
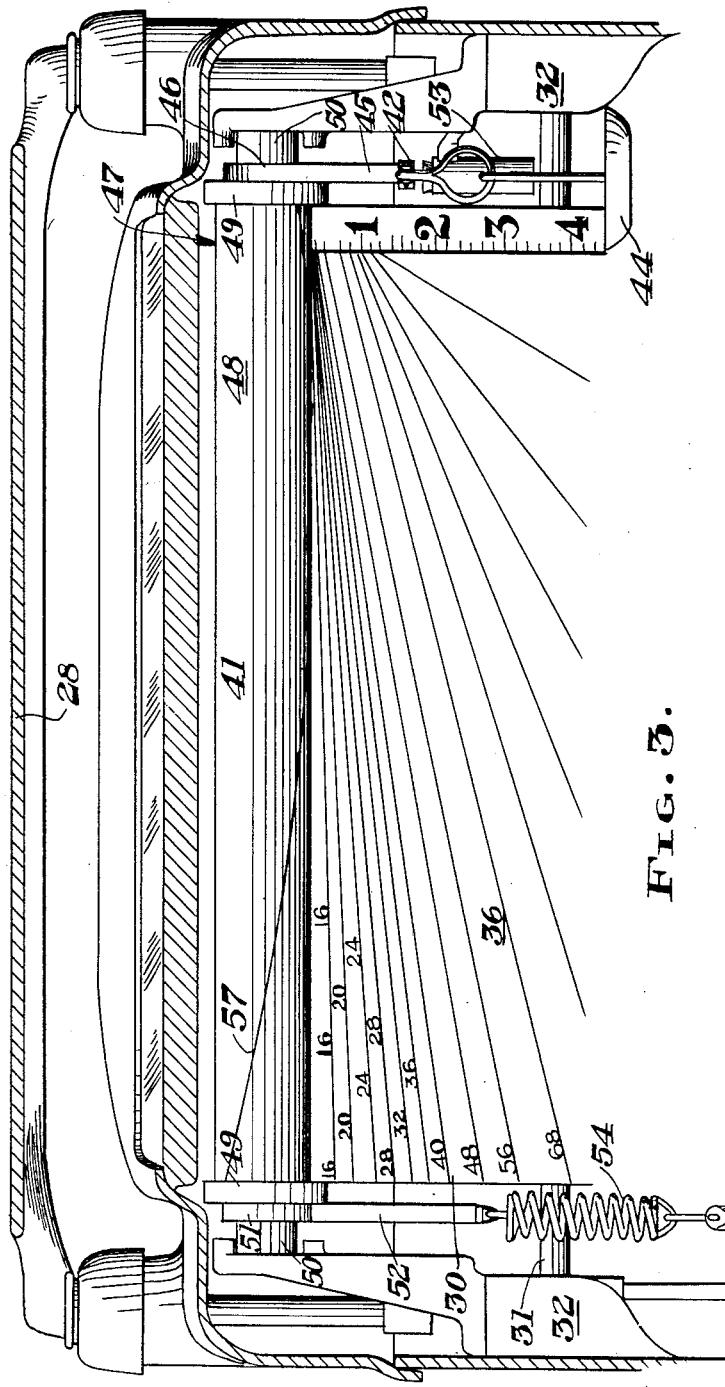
INVENTOR
Nathan A. Hallwood
Herschel C. Omohundro
attorney

*INVENTOR.*
Nathan A. Hallwood
BY
Herschel C. Omohundro
*ATTORNEY.*

Patented Sept. 16, 1952

2,610,844

UNITED STATES PATENT OFFICE 2,610,844

SCALE

Nathan A. Hallwood, Columbus, Ohio; Thelma T. Hallwood, administratrix de bonis non for said Nathan A. Hallwood, deceased, assignor to Thelma T. Hallwood, Columbus, Ohio Application December 16, 1946, Serial No. 716,468

9 Claims. (Cl. 265—29)

This invention relates generally to scales but is more particularly directed to apparatus for determining the number of duplicative parts or articles in a group thereof through the comparison of the weight of the group of articles with that of a known number of such articles.

This application is directed to the same type of apparatus illustrated and described in my copending application Serial Number 568,817, filed December 19, 1944, now Patent No. 2,502,090, issued March 28, 1950, of which this application is a continuation-in-part.

One of the objects of this invention is to provide a mechanism for determining the number of duplicative articles in a group thereof, the mechanism having a graph-like chart and means operated by the weight of the group of articles together with the weight of a predetermined number of the articles for selecting a point on the chart representing the number of articles or a predetermined fractional part of such number.

Another object of the invention is to provide a mechanism for counting the number of duplicative articles in a group, which mechanism includes a scale-like device having a chart graduated in a particular manner and means responsive to the weight of the group of articles for moving the chart relative to an index member, the mechanism having a second scale-like device with an index responsive to the weight of a known number of the duplicative parts to select the point on the chart at which the reading must be taken to determine the number of duplicative articles in the group.

A still further object of the invention is to provide a mechanism of the type mentioned in the preceding paragraph with the second-mentioned scale-like device having a pair of members movable relative to one another in response to the increase or decrease in weight of the articles applied thereto, the relative movement causing an index point to traverse the chart in the operation of selecting a point thereon at which the reading is to be taken.

Another object is to provide the mechanism with a movable index of a scale-like nature in which is provided a pivoted beam, a weight receiver, an indicator and yieldable means for resisting the movement of the beam, the indicator including crossing stationary and movable reference lines, the movement of the latter causing the point at which it crosses the former to traverse the chart.

An object also is to form the movable index of the mechanism with a transparent cylinder and means actuated by the weight of a known number of the articles to be counted for revolving the cylinder, the latter having a helical reference line formed thereon which crosses and moves relative to a stationary reference line when the cylinder revolves, the point at which the stationary and movable reference lines cross shifting longitudinally of the former as the cylinder revolves, the degree of movement being dependent upon the weight of the selected number of articles applied to the scale-like device.

Further objects and advantages of the present invention will be apparent from the following description, reference being had to the accompanying drawings wherein a preferred form of embodiment of the invention is clearly shown.

In the drawings:

Fig. 3 is a vertical transverse sectional view taken through the device on the plane indicated by the line III—III of Fig. 2;

Fig. 4 is a plan view of a portion of a secondary scale device used in the present invention;

Figure 1:
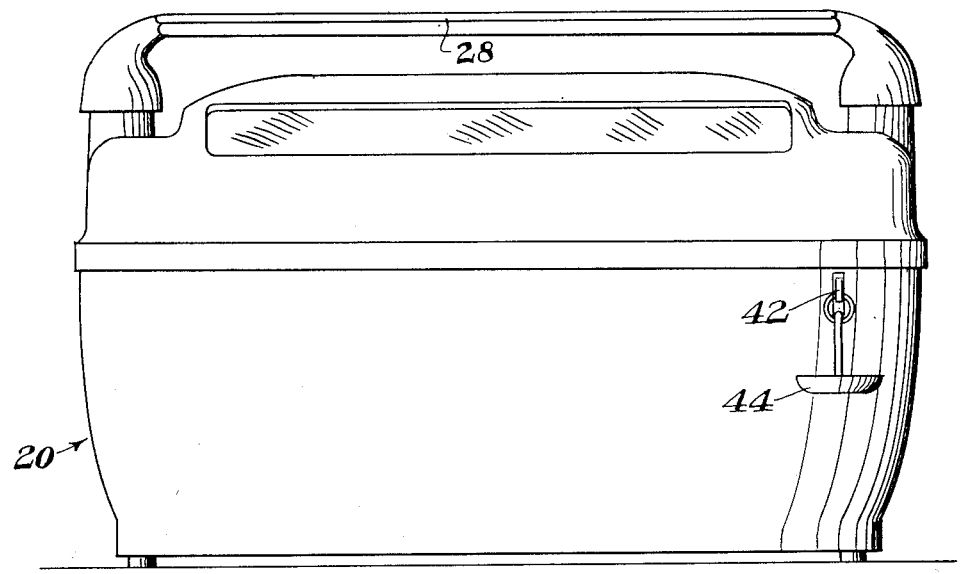
Fig. 1 is a front elevational view of a device for determining the number of duplicative articles in a group, formed in accordance with the present invention.
Figure 2:
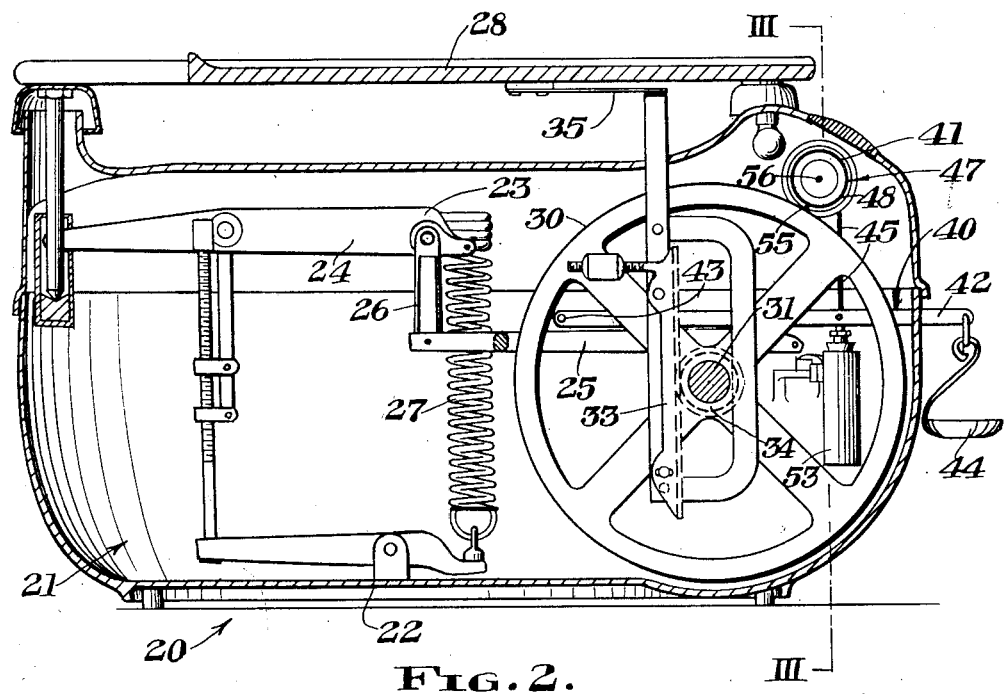
Fig. 2 is a vertical longitudinal sectional view taken through the device shown in Fig. 1.

Referring more particularly to the drawings, the numeral 20 designates the complete mechanism for counting duplicative articles. This mechanism includes a weighing scale 21 which may be of any suitable type, the one shown being selected for convenience in illustration only and conforming to the showing in the above-mentioned co-pending application. Briefly, the scale includes a base 22, a lever system 23 supported for pivotal movement on the base, the lever system having a pair of lever sections 24 and 25 connected by a link 26. Spring 27 is provided to yieldably resist the movement of the lever system when weight is applied to the platform 28 supported by the lever system.

Scale 21 also includes a drum 30 which is journalled for rotation in the base through the provision of a shaft 31 and bearings 32. Motion is imparted to the shaft 31 by a rack 33, the teeth of which mesh with those on a pinion 34 carried by the shaft 31. The rack is suspended from the under side of the platform 28 and movement of the latter in a vertical direction will be directly transmitted by the rack, the pinion and the shaft, to the drum 30. A suitable thermostat 35 is arranged between the rack and the platform to compensate for temperature variations.

The drum 30 also includes a chart 36 which is similar to the chart shown in the co-pending application mentioned above, in that it has a plurality of reference lines radiating from a point through a row of points spaced in a line extending circumferentially around the drum, this line being parallel to the direction of movement of the chart during the operation of the scale. It will be noted that, in the chart shown, the point from which the lines radiate is located at the extreme right edge of the chart and that the reference lines extend through points representing weight graduations on the chart. An inspection of the drawings will also show that these lines extend to spaced points at the left edge of the chart, these points being spaced in multiples of the spacing between the points at the right side of the chart. These reference lines bear the same numbers throughout the full width of the chart, the spacing between the lines increasing uniformly across the full width of the chart.

As is usual in weighing scales, the lever multiplication and the spring force selected is such as to cause the chart to move equal distances upon the application of equal units of weight to the platform. It should be obvious that any unit of weight may be selected for the major graduations of the chart, for example, the chart may be graduated into pounds and ounces or pounds and tenths of pounds, as shown more particularly in Fig. 5, depending upon the desires of the manufacturer; the principles of operation of the mechanism will be the same in either case.

The device forming the subject matter of this invention differs from that of the co-pending application mainly in the construction of the means utilized for selecting the portion of the chart from which a reading is to be taken. In this case, the chart portion selector includes a secondary scale 40 having a novel indicator mechanism 41. The secondary scale comprises a lever 42, pivoted at one end 43 to the scale base 22 and supporting a pan 44 at the opposite end. Lever 42 has a tape 45 secured thereto at one end, the other end of the tape being wound around and secured to a disk 46 forming part of an indicating device 41. This disk 46 is carried by a cylinder assembly 47 including a transparent tube or cylinder 48 with end caps 49 and bearings 50 in which the cylinder is journalled for rotation about its longitudinal axis. The cylinder assembly includes a second disk 51 around which a second tape 52 is wound, this tape being secured to one end of a coil spring 54 employed to yieldably resist turning movement of the cylinder 48. A dashpot 53 is connected with lever 42 to dampen the oscillations thereof and prevent the transmission of shocks to the cylinder and spring 54 when weights are applied to the pan 44.

The secondary scale includes also, a pair of index members or wires 55 and 56, the former being stationarily supported between the cylinder 48 and the drum 30 and the latter extending longitudinally through the cylinder in the axial center thereof. A third index member comprising a line 57 is etched or otherwise formed on the cylinder 48. This line extends helically around the cylinder and is movable therewith, the line extending one half the circumference of the cylinder throughout the full length thereof.

When the cylinder is rotated, due to the application of a weight to the pan 44, the index line 57 moves between the wires 55 and 56. As the line 57 is helical it will be angular to and cross wires 55 and 56 and as the cylinder revolves, the point at which the lines cross moves longitudinally of the cylinder and the chart. In use, the operator aligns wires 55 and 56 when sighting, and the point on the chart directly in back of the point at which these wires are crossed by line 57 is the point at which the reading is to be taken.

In the construction of the secondary scale, the ratio of the lever 42 and the force of spring 54 are calculated so that a fraction of the unit of weight into which the chart is divided will cause sufficient movement of the cylinder to make the point where the lines cross move the full length of the cylinder. For example, if, as shown in Fig. 3, the chart is graduated into pounds and ounces, the capacity of the secondary scale may be made one ounce, or in other words, one ounce of weight applied to the pan 44 will cause the point at which the index lines cross, to travel the full length of the cylinder.

Figure 5:
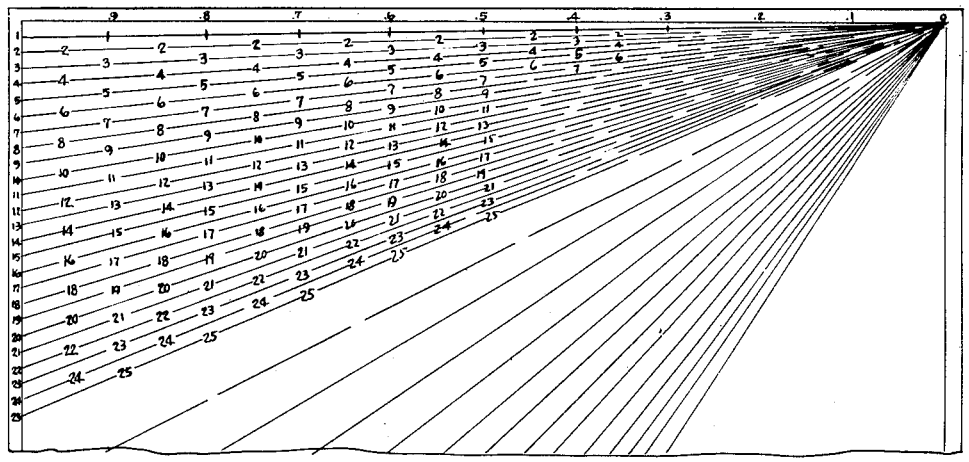
Fig. 5 is an elevational view of a portion of a modified chart which may be used with the mechanism illustrated in Figs. 1 to 4, inclusive; and, Fig. 6 is a similar view of a still further modified form of chart.

In Fig. 5, the chart is shown graduated into pounds and tenths of pounds. With such a chart, the secondary scale may have a capacity of one tenth of a pound.

When a scale formed in accordance with the invention is operated, the group of articles to be counted is placed on the platform 28. The mass of this group of articles will cause the chart of the machine to revolve in proportion to the weight. One of the articles, or if they are small, ten or one hundred, may be placed in the pan of the secondary scale. The mass of these articles will cause rotation of the cylinder 48 and movement of the point where the wires cross a distance proportional to the weight thereof. The number on the line on the chart nearest the point where the lines cross multiplied by the number of articles in the pan 44 will be the number of articles in the group on the platform. For instance, if the drum is rotated to such a point and the cylinder 48 revolves the distance necessary to have lines 55, 56, and 57 cross line numbered 68 on the chart, the group on the platform will contain 68 articles if a single article is disposed in the pan 44, 680 articles if ten are contained in the pan 44 or 6800 articles if 100 are contained in the pan.

From the foregoing it will be seen that a mechanism has been provided with which the number of articles in a group may be accurately and quickly determined with ease and without the necessity of the operator making any complicated calculations.

Figure 6:
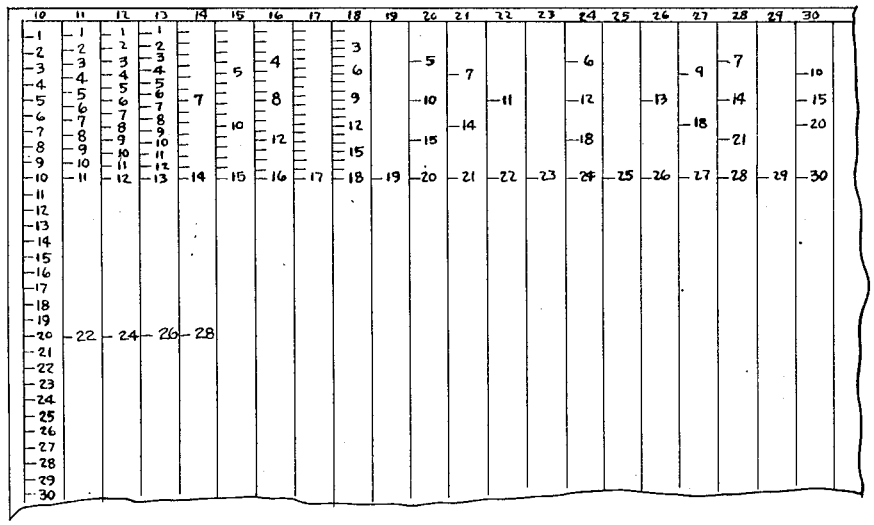

The invention may be modified in numerous ways, for example, as shown in Fig. 6, the chart may be provided with a plurality of parallel rows or columns of graduations or numbers. Each column is graduated differently, the chart being first divided into equal parts to represent units of weight such as pounds, then each of these divisions being further divided in each of the individual columns. For example, the first column may be divided by graduating the equal parts into ten divisions, the next column by graduating the equal parts into eleven divisions, the next into twelve and so on until all the columns are divided. With this chart the secondary scale must be so constructed that when articles are applied to the weight receiver thereof, an index will move transversely of the chart to direct the operator's attention to a particular column in which the readings should be taken. The secondary scale is of course, operated by the weight of the known number of articles and a column should be selected in which a known number of articles in the pan of the secondary scale will position the index at a corresponding number for a selected unit of weight. When the proper column has been indicated by the secondary scale repeated weighing operations may be made, all the readings being taken in the same column.

While the invention may be modified in numerous ways the rights to all such modifications as fall within the scope of the following claims is hereby reserved.

I claim:

1. In a scale of the type having a cylindrical chart supported for rotation about its longitudinal axis and a lineal indicator disposed adjacent said chart; means provided with a helical reference line and supported for rotation about an axis extending substantially parallel to the axis of said cylindrical chart, rotation of said means causing said helical reference line to cross said lineal indicator; and weight-operated means for imparting rotary movement to the first-mentioned means.

2. In a device for determining the number of duplicative articles in a group thereof of the type having a stationary index and a chart supported for movement relative to said index at right angles to the length thereof; an index movable longitudinally of said stationary index, said movable index having a helical reference element; and weight actuated means for moving said helical reference member about an axis a distance determined by the weight of a known number of said duplicative articles.

3. In a device for determining the number of duplicative articles in a group thereof of the type having a stationary index and a chart supported for movement relative to said index at right angles to the length thereof; index means movable longitudinally of said stationary index, said movable index having a transparent cylinder journalled for rotary movement; a helical reference line on said cylinder, said helical line being disposed adjacent and crossing said stationary index; and means actuated by the weight of a known number of said duplicative articles for rotating said cylinder to move the point where said helical line crosses said stationary index longitudinally of the latter, said cylinder being rotated through certain increments by predetermined units of weight.

4. In a device for determining the number of duplicative articles in a group thereof of the type having a stationary index and a chart supported for movement relative to said index at right angles to the length thereof; index means movable longitudinally of said stationary index, said movable index having a glass cylinder extending parallel to said stationary index and supported for rotation about its longitudinal axis; a line extending helically around said cylinder, said line being disposed adjacent and crossing said stationary reference element; means actuated by the weight of a known number of duplicative articles for rotating said cylinder to cause the point at which said helical line crosses said stationary reference member to move longitudinally of the latter, said cylinder being rotated equal increments for equal units of weight.

5. In a device for determining the number of duplicative articles in a group thereof of the type having a stationary index and a chart supported for movement relative to said index at right angles to the length thereof; index means movable longitudinally of said stationary index, said movable index means having an element coextensive with and spaced from said first-mentioned stationary index; another element movable between the first mentioned element and said stationary index; and means responsive to the weight of a known number of said duplicative articles for moving said last mentioned element.

6. In a scale of the type having a cylindrical chart supported for rotation about its longitudinal axis; a member provided with a helical index line supported for rotation about an axis extending parallel to the longitudinal axis of said chart; a stationary index extending parallel to the axes of said chart and member and disposed therebetween, rotation of said member causing said helical index line to cross said stationary index; and weight-operated means for imparting rotary movement to said member.

7. In a scale of the type having a cylindrical chart supported for rotation about its longitudinal axis; a member provided with a helical index line supported for rotation about an axis extending parallel to the longitudinal axis of said chart; a stationary index disposed in the plane occupied by the axes of said chart and member, rotation of said member causing said helical index line to cross said stationary index; and weight-operated means for imparting rotary movement to said member.

8. In a scale of the type having a cylindrical chart supported for rotation about its longitudinal axis and a lineal indicator disposed adjacent said chart in parallel relationship to the longitudinal axis thereof; a transparent tubular member supported for rotary movement about an axis disposed in parallel relationship to the axis of said chart and in a plane common to said axis and said lineal indicator; a second lineal indicator supported on the axis of said transparent tubular member; a helical indicator line carried by and movable with said transparent tube; and weight actuated means for imparting controlled rotary motion to said transparent tube.

9. In a scale, a weighing mechanism; an indicating mechanism operated by said weighing mechanism, said indicating mechanism comprising a transparent tube supported for rotation about its longitudinal axis; a lineal indicator supported on the longitudinal axis of said tube; a second lineal indicator supported adjacent the exterior of said tube; and a helical indicator line on said tube and rotatable therewith, said helical indicator crossing said lineal indicators upon rotation of said tube.

NATHAN A. HALLWOOD.

REFERENCES CITED

The following references are of record in the file of this patent:

UNITED STATES PATENTS

| Number | Name | Date |
| --- | --- | --- |
| 329,237 | St. John | Oct. 27, 1885 |
| 1,277,698 | Cross | Sept. 3, 1918 |
| 1,459,886 | Hammond | June 26, 1923 |
| 1,729,788 | Mittendorf | Oct. 1, 1929 |
| 1,989,396 | Bohne | Jan. 29, 1935 |
| 2,272,574 | Nothe | Feb. 10, 1942 |
| 2,316,627 | Sang | Apr. 13, 1943 |